J. F. Mallett,
Horseshoe.
No. 44,009.        Patented Aug. 30, 1864.
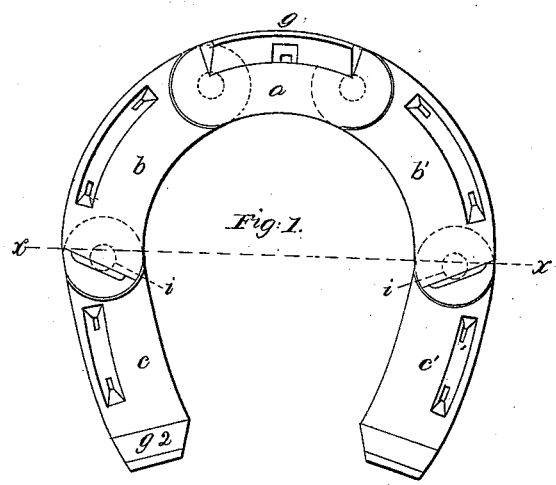
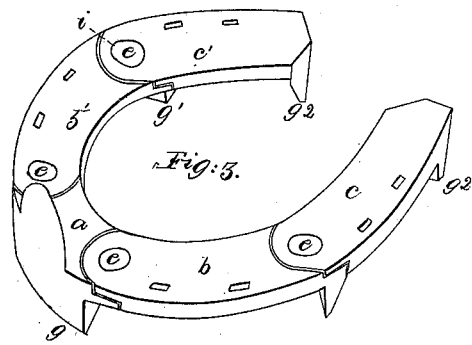
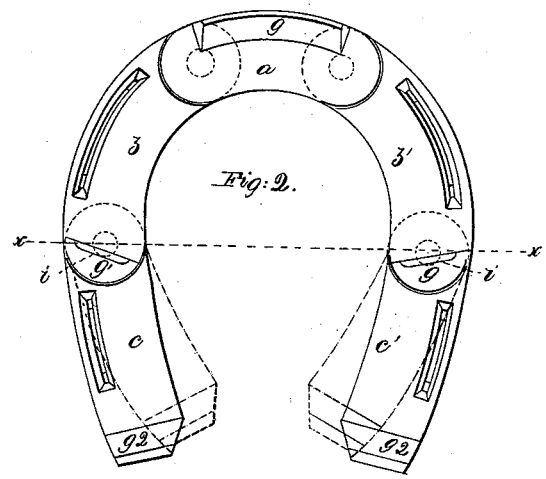
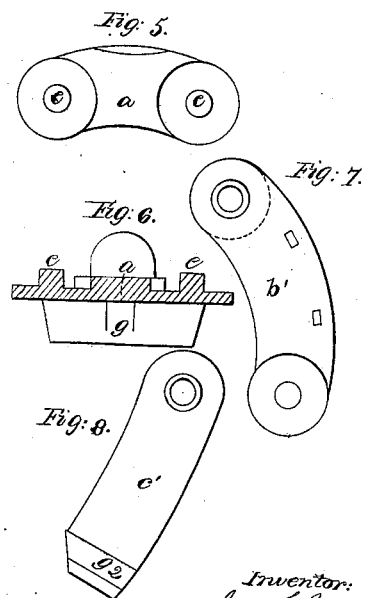
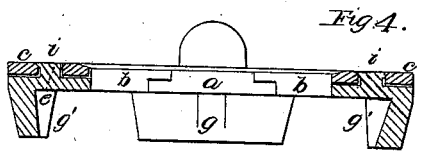
Witnesses:
R. F. Campbell
E. Schafer
Inventor:
Jas. F. Mallett
by his atty.
Mason Fenwick & Lawrence

UNITED STATES PATENT OFFICE.

JAMES F. MALLETT, OF NEW YORK, N. Y.

IMPROVED HORSESHOE.

Specification forming part of Letters Patent No. 44,009, dated August 30, 1864.

*To all whom it may concern:*

Be it known that I, JAMES F. MALLETT, of the city and county of New York, State of New York, have invented a new and Improved Horseshoe; and I do hereby declare that the following is a full, clear, and exact description thereof, reference being had to the accompanying drawings, making a part of this specification, in which—

Figure 1 is a bottom view of my shoe. Fig. 2 is a similar view showing the same shoe contracted at two points. Fig. 3 is a perspective view of the top of the shoe. Figs. 4, 5, 6, 7, and 8 are views of the shoe in detail, showing the construction of the sectional parts thereof.

Similar letters of reference indicate corresponding parts in the several figures.

This invention relates to improvements in that class of horseshoes which are constructed of sectional parts jointed together, with a view to adapt them to hoofs of different sizes, and thereby avoid the necessity of heating and bending the shoes for this purpose.

The main object of my invention is to so construct sectional jointed horseshoes that they are not only adapted to hoofs of various sizes, but which are with equal facility conformable to hoofs of different shapes, and which are also so constructed that they shall accommodate themselves to the natural growth or spreading of the hoof when nailed thereto, as will be hereinafter described.

Another object of my invention is to construct a sectional jointed shoe which shall be less liable to break the joints than hitherto, and wherein all danger arising from loose rivets injuring the hoof is avoided, as will be hereinafter described.

Another object of my invention is to support a horseshoe which is jointed at each side at an intermediate point between the heel of the shoe and the toe-joint upon calks, which are so applied or arranged as to give a firm bearing to the hoof and also a support for each joint, as will be hereinafter described.

My invention, finally, has for its object the construction of a sectional-jointed horseshoe in such manner that the heel-sections thereof shall be susceptible of lateral adjustment independently of those portions which are in advance of the greatest lateral diameter of the hoof, as will be hereinafter described.

To enable others skilled in the art to make and use my invention, I will describe its construction and operation.

Before describing my invention I deem it proper to state that almost all the diseases which arise in the feet of horses are in some way attributable to the inflexibility of the shoes, which, as hitherto constructed, do not allow the hoof to expand naturally, but cramp and confine it in such manner as to check the natural flow of the juices of the hoof, and thus produce dryness and other diseases consequent thereon. This difficulty I effectually remedy by constructing shoes which will expand as the hoof grows, and which will also be sufficiently flexible to admit of the natural elasticity of the hoof under all circumstances.

In Fig. 1 I have represented my improved horseshoe adjusted to conform to a normal hoof. In this view it will be seen that all that portion of the shoe forward of the red line $x\,x$ forms a semicircle, and that the heel portions, extending on the opposite side of said line are curved tangents of said semicircle, gradually converging toward each other.

In Fig. 2 I have represented the same shoe adapted to fit a differently-shaped foot or hoof. In this view the sides of the shoe are contracted, but the distance between the extremities of the heel portions remains the same as in Fig. 1. The red lines, however, represent these heel portions adjusted nearer together. It will thus be seen that the shoe is susceptible of being adapted to hoofs of various sizes, as well as of different shapes, and that the heel-sections of the shoe can be adjusted without changing the shape of the forward portion of the shoe, and also that the forward portions can be adjusted and set farther apart or nearer together without the necessity of changing the distance between the rear ends of the rear portions.

It will be seen that my shoe is composed of five separate pieces or segments of circles. $a$ represents the toe-section; $b\,b'$, the side sections; and $c\,c'$ the heel-sections. These several sections are pivoted together, so as to form close or "rule-joints," as clearly shown in the drawings, and these joints are made by "halving" and overlapping the rounded ends of the sections, employing as connections the cylindrical pins $e\,e\,e$, which are cast or otherwise formed on the underlapping ends, and made of sufficient length to project through the upper sections and admit of having their ends mashed down into countersinks to form rivets. By thus connecting the sections together I do not leave broken surfaces nor openings, which would be liable to fill up with foreign substances, and thus prevent these joints from working; and by my mode of forming the rivets they cannot wear loose nor injure the hoof by being forced therein, while at the same time they increase the strength of metal at the joints and render the shoe less liable to break at these points than it would be if the rivets passed through both ends of the joint.

It will be seen that I have four joints in my shoe, and that they are so disposed as to enable me to accommodate the sections to the shape of a horse's foot—i. e., the two intermediate joints at $i$ $i$ allow the forward sections, $b$ $b'$, to be adjusted farther apart or nearer together, according to the width of the hoof, without changing the distance between the rear ends of the heel-sections $c$ $c'$, as represented by a comparison of the two Figs. 1 and 2; or said joints $i$ $i$ will admit of the heel-sections being adjusted independently of the three forward sections, to adapt the shoe to very wide or very narrow "quarters," as indicated by the red lines, Fig. 2.

It is the side joints or those which are at intermediate points between the rear ends of the heel-sections and the forward joints that enable me to accommodate my shoes to the shape of different-sized hoofs; and it is desirable that these joints be located at or as near as possible to the points represented in the drawings; otherwise the difficulty existing in the old two or three jointed shoes will be experienced to a greater or less degree. In referring to the three-jointed stiff side-bar shoes, I will here state that they cannot be spread out at the sides without also spreading out their rear ends so far as to render them useless; nor can they be spread out at the heel without distorting their shape at their sides; but by the addition of the other joints herein described the shoe can be adjusted at the sides as well as at the heel. After my shoes are nailed to the hoofs the joints will yield and the rear sections will expand in proportion as the hoof increases in size without loosening or straining the nails; consequently there will be no cramping of the frog nor injurious results from this cause, and the shoes will not be liable to come off as easily as the old shoes.

The shoe represented in the drawings is calked; but I do not confine my invention to calked shoes exclusively, as it will be evident that the use of calks is optional. The toe-calk $g$ is made of sufficient width to support the two forward joints, and the calks $g'$ $g'$, between the heel-calks $g^2$ $g^2$ and the toe-calk, are arranged directly under the joints $i$ $i$, so as to support the shoe at these points. The nail-holes can be made along the edges of the several sections and the shoes nailed to the hoofs in the usual manner.

It is obvious that the side sections and heel sections of my shoe may be subdivided and jointed together; but as this will render the shoes unnecessarily expensive and weak, they will probably never be made with a greater number of joints than I have above described.

Having thus described my invention, what I claim as new, and desire to secure by Letters Patent, is—

1. A sectional jointed horseshoe which is so constructed that it can be expanded or contracted in width either at the heel or at an intermediate point between the heel and toe, or at both of said points, at pleasure, substantially as described.

2. A sectional jointed horseshoe which is constructed with one or both of its heel-sections jointed to forward jointed sections, substantially as and for the purposes described.

3. So constructing the pivot-pins of a sectional jointed horseshoe that they constitute a part of the underlapping portions of the sections, substantially as described.

4. The use of projections $g$ $g'$ $g^2$, applied to a sectional jointed horseshoe in such manner as to strengthen the sections at the joints and to constitute calks for preventing the horse from slipping, substantially as herein described.

JAS. F. MALLETT.

Witnesses:
R. C. ELLIOTT,
GEORGE SCHAEFER.